United States Patent [19]
Shiozawa et al.

[11] 4,426,147
[45] Jan. 17, 1984

[54] MEANS FOR CONTROLLING AN INTERCHANGEABLE LENS TYPE CAMERA

[75] Inventors: Kazuo Shiozawa; Hiroshi Sawano, both of Hachioji, Japan

[73] Assignee: Konishiroku Photo Industry Co., Ltd., Tokyo, Japan

[21] Appl. No.: 355,462

[22] Filed: Mar. 8, 1982

[30] Foreign Application Priority Data

Mar. 16, 1981 [JP] Japan .................................. 56-36588

[51] Int. Cl.³ ............................................. G03B 17/00
[52] U.S. Cl. .................................................. 354/286
[58] Field of Search .................... 354/23 D, 46, 60 R, 354/195, 197, 286, 288, 289, 295, 202; 352/142; 350/252, 257, 423, 437; 250/204

[56] References Cited

U.S. PATENT DOCUMENTS

| Re. 29,276 | 6/1977 | Mitani et al. | 354/46 X |
| 3,849,785 | 11/1974 | Schulze | 354/46 X |
| 4,080,531 | 3/1978 | Stauffer | 250/204 |
| 4,196,997 | 4/1980 | Ohmori et al. | 354/286 |

Primary Examiner—William B. Perkey
Attorney, Agent, or Firm—Jordan B. Bierman; Linda Bierman

[57] ABSTRACT

A camera is provided with a series of interchangeable lenses each provided with a source of information preferably in the form of a variable resistor, which is indicative of the type of lens. The camera body is provided with a source of power and an information processing unit. The variable resistor in each lens is connected to the camera body through an electrical contact and provides information to the camera not only of the type of lens attached, through a stepped range of voltages, but secondary information variable according to focal length, etc. in increments smaller than the individual steps in the voltage range.

18 Claims, 5 Drawing Figures

MEANS FOR CONTROLLING AN INTERCHANGEABLE LENS TYPE CAMERA

BACKGROUND OF THE INVENTION

1. Field of the Invention

The present invention relates to improvements of means for controlling an interchangeable lens type camera and more particularly to improvements in the control means, wherein a resistor is provided on the side of the interchangeable lens to give information necessary for determining the photographing conditions in form of voltage information; the voltage information derived from said resistor is fed into an information processing unit in the camera body side through contact points to be connected when the interchangeable lens is coupled to the camera body, so that photographing conditions can be determined.

2. Description of the Prior Art

The conventional types of the control means as described above have been such ones that, in the case that the information of a focal length such as a wide-angle, a standard, or telephoto lens and the information of an exposure compensation are given from the interchangeable lens side to the camera body side for example, a resistor for giving the focal length information and a variable resistor for giving an exposure compensation information are provided on the interchangeable lens side, and the voltage information given from each of the resistors are separately fed in an information processing unit on the camera body side through the respective contact points, and the inoformation processing unit will determine photographing conditions in accordance with the abovementioned information, an ASA information having been prescribed on the camera body side and so on.

SUMMARY OF THE INVENTION

The present invention provides a means for controlling an interchangeable lens type camera in which a plurality of information as described above is fed into the camera body side at one contact point. The control means of the present invention is characterized in that the resistor is made variable to give a voltage information being a total of a voltage information which varies stepwise by a range greater than a predetermined range, and a voltage information which varies within the predetermined range, and along therewith there provides a separation means between the contact point on the camera body side and the information processing unit, and the separation means separates the voltage information into the two, that is, one is variable stepwise by a range greater than the predetermined range and another is variable within the predetermined range.

In other words, the control means of the present invention has the superb merit in comparison with the conventional control means which necessitate an independent contact point for each of a plurality of voltage information, said merit being that the danger of occurrence of a faulty connection, and damage or the like to the contact points are remarkably reduced, so that additionally reliability is improved. Installation cost on an interchangeable lens side is reduced, so that the cost-wise advantages can also be enjoyed. comes off without any trouble even in the case that an interchangeable lens relating to the invention and that relating to the conventional control means are mixedly used. Other objects and advantages of the invention will become apparent from the following description.

DETAILED DESCRIPTION OF THE INVENTION

The following is the description of the present invention with reference to the illustrated examples thereof.

Figure 1:
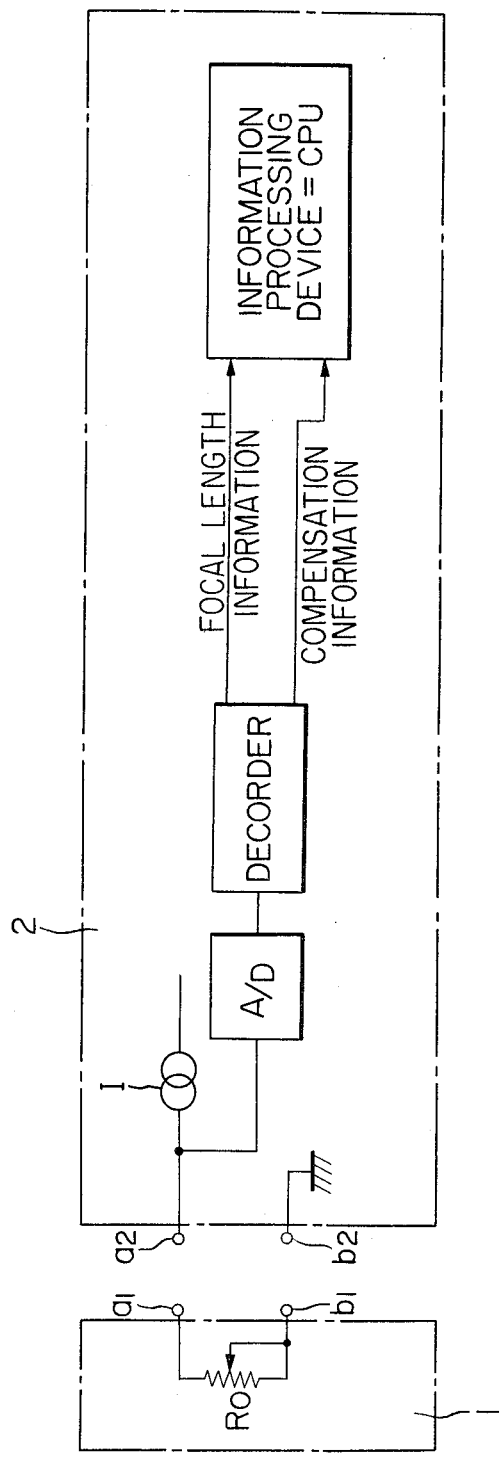
FIG. 1 through FIG. 3 are block circuit diagrams of the principal forms of the invention.
Figures 2, 3:
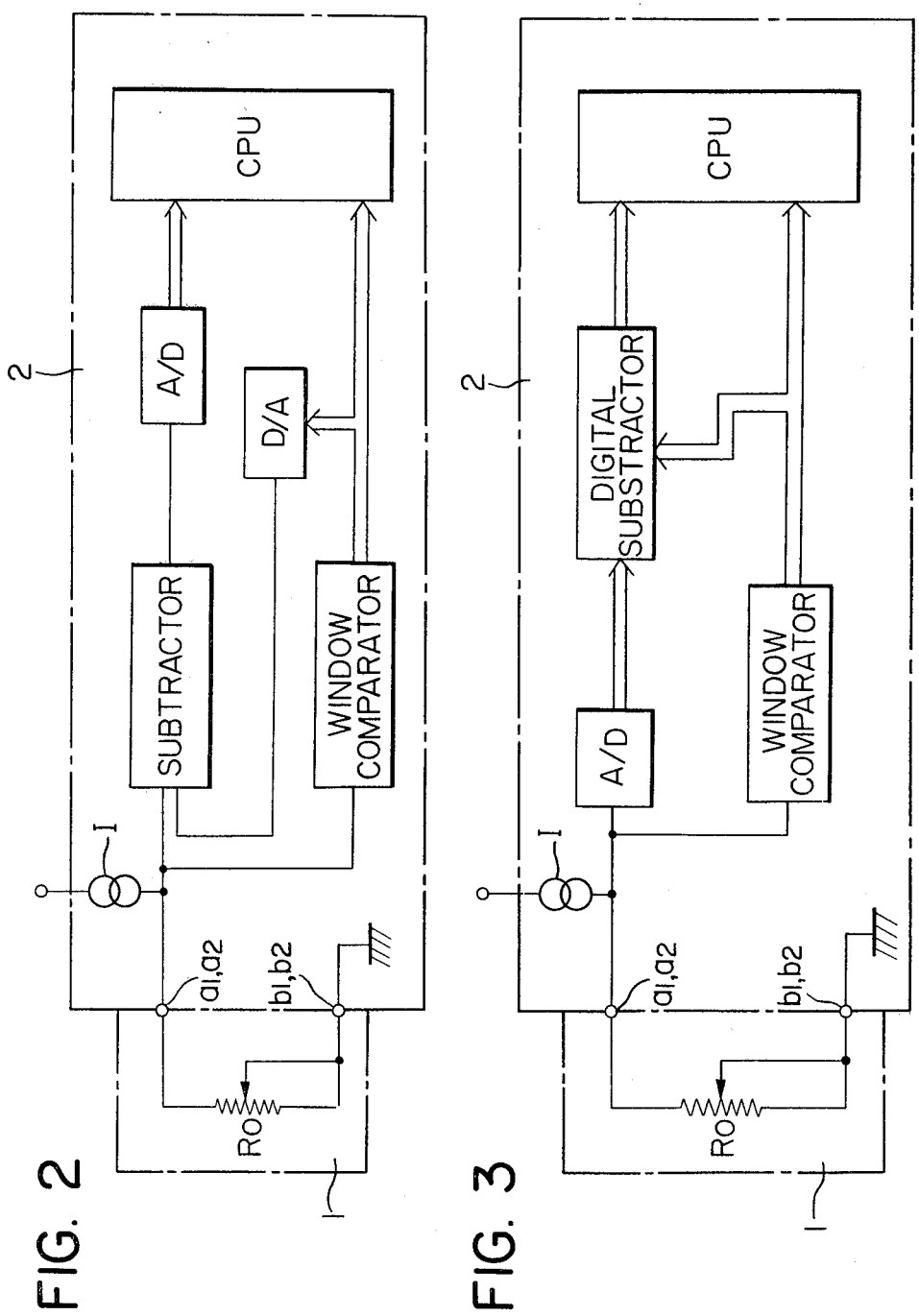
Figure 4:
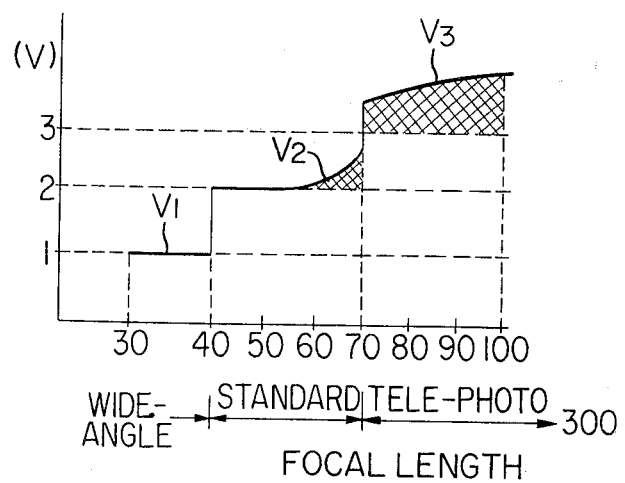
FIG. 4 and FIG. 5 are graphs illustrating examples of a voltage information fed to the camera body side from the interchangeable lens side in a zoom lens and a macro lens, respectively.
Figure 5:
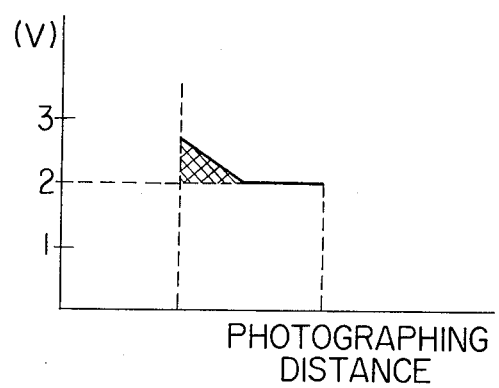

Each of FIGS. 1 through 3 shows a circuit diagram of the principal block embodying an example of the control means of the invention, and FIG. 4 and FIG. 5 are the graphs indicating an example of the voltage information which is fed from the interchangeable lens side of a zoom lens and a macro lens, respectively.

In the drawings, in each case interchangeable lens 1 is coupled to camera body 2, and contact point a1 for a voltage information and contact point b1 for grounding both on the side of interchangeable lens 1 are connected to input contact point a2; contact point b2 for grounding respectively, and thus a constant current flows from constant source I on the camera body side 2, and at that time variable resistor R0 on the side of interchangeable lens 1 produces voltages such as those which are designated as V1, V2 or V3 in FIG. 4 or that shown in FIG. 5, in accordance with the kind of said interchangeable lenses. On the side of camera body 2, the aforesaid voltage is divided into a basic voltage which is variable stepwise by a range greater than a predetermined range such as 1 v, 2 v or 3 v according to the kind of interchangeable lens and an additional voltage provided with the shadings which are variable within the predetermined range with a limit of 0.64 V at the rate of 0.01/EV, that is narrower than the aforementioned stepped variation range, and the separated voltages are fed to the information processing unit, respectively.

FIG. 1 shows an example, wherein the voltage having been fed from the side of interchangeable lens 1 is converted into the digital signals among which the digital signal from the aforesaid basic voltage is set, for instance to two bits and that from the additional voltage is set to six bits, by means of analog-digital converter A/D, and said two bit digital signal is converted into the voltage information which represents the type of interchangeable lens such as wideangle, standard or tele-photo, and said six bit digital signal into the voltage information for correction which represents such as the focal length of a zoom lens, and the said respective voltage information is fed to the information processing unit.

FIG. 2 shows an example, wherein the voltage having been fed from the side of interchangeable lens 1 is converted only to part of the basic voltage out of said voltage into the digital signal by means of a window comparator, and said digital signal is given to central information processing unit CPU and to digital-analog converter D/A, and the basic voltage derived from digital-analog converter D/A is subtracted from the voltage fed from the side of interchangeable lens 1 by means of a subtractor, and thus subtracted additional voltage is converted into the digital signal by means of analog-digital converter A/D and the then thus converted digital signal is forwarded to central information processing unit CPU; thus, said CPU will determine the photographing conditions in accordance with said digital signals.

FIG. 3 shows an example, wherein the voltage derived from the side of interchangeable lens 1 is fed both to analog-digital converter A/D and to the window comparator. Only the part of the basic total voltage out of said voltage is converted into the digital signal by means of said window comparator, and the digital signal thus converted is fed both to central information processing unit CPU and to the digital subtractor. The digital signal for the part of the basic voltage derived from the window comparator is subtracted from the digital signal which has been converted from the voltage generated on the side of interchangeable lens 1 that was fed from analog-digital converter A/D by means of the digital subtractor, and thus, the photographing conditions are determined by giving the consequently obtained digital signal for the part of the consequently obtained additional voltage to central information processing unit CPU.

It is however to be understood that the present invention is not limited to the above examples but may be otherwise variously embodied, for instance, it may be provided that the variable resistor on the side of interchangeable lens 1 gives an added voltage information in such form that part of the additional voltage is subtracted from the basic voltage by means of the variable resistor on the side of interchangeable lens 1, or it may also provide that, on the side of camera body 2, the voltage information fed from the side of interchangeable lens 1 is not converted into the digital signal but, similarly to the cases of illustrated examples, may also be separated into the basic voltage information which is variable by a range greater than a predetermined range and the additional voltage information which is variable within the predetermined range, and that the predetermined range of voltage should not always be 1 V which is given in the examples and the difference between the steps is not limited also to the same difference of voltages, that is a matter of course. Further, the voltage information may contain more than three sets of information represented by a first basic voltage information, second basic voltage information and added voltage information, wherein the second basic voltage information varies within the range by which the first basic voltage information varies stepwise. It is also possible that the length of the pin on an interchangeable lens may be utilized in place of a resistor in a interchangeable lens.

Other changes within the scope of the present invention will occur to those skilled in this art and the invention is not intended to be limited to the examples given but only as may be required by the claims which follow.

What is claimed is:

1. In a controlling means for a camera for determining a photographic condition, in which there is provided on a side of an attachable interchangeable lens an information transmission means to transmit information necessary for the determination of a photographing condition for such lens, which is fed to an information processing unit within the camera body through a contact connected at the time when the interchangeable lens is coupled to the camera body, the improvement comprising an information transmission means consisting of a first transmittable total value consisting of a first source of information which is represented by a total value which is variable stepwise over a range greater than a predetermined range, and a second source of information represented by a value variable within said predetermined range, and in which said camera body includes separating means between said contact and said information processing unit to separate the total information received from said information transmission means into said first and second sources of information.

2. Information controlling means according to claim 1, in which said information transmission means is a resistor providing values representing said first and second sources of information.

3. Information controlling means according to claim 1, in which said first source of information remains the same for each interchangeable lens.

4. Information controlling means according to claims 2 or 3, in which said second source of information is different for each interchangeable lens.

5. Information controlling means according to claim 4, in which said interchangeable lens is a zoom lens and said second source of information represents focal length.

6. Information controlling system according to claim 4, in which said interchangeable lens is a macro lens and said second source of information represents photographing distances.

7. Information controlling system according to claim 2, in which said first source of information represents a wide-angle, standard or tele-photo lens.

8. Information controlling system according to claim 2, in which said first source of information represents the open F value of the interchangeable lens.

9. Information controlling system according to claim 2, in combination with a constant current source provided in said camera body and means connecting said resistor to said constant current source through said contact.

10. An interchangeable photographing lens, an information transmission means attached to said lens for transmitting information representative of a predetermined photographing condition, a camera body, an information processing unit in said camera body and means forming a contact point connecting said information transmission means to said information processing unit when the interchangeable lens is coupled to the camera body, and in which said information is represented by total value comprising a first value which varies stepwise by a range greater than a predetermined range and represents a first information and a second value which is variable within the predetermined range and represents a second information.

11. An interchangeable photographing lens according to claim 10, in which the information transmission means is a resistor providing values representing said first information and second information.

12. An interchangeable photographic lens according to claim 11, in combination with a constant current source in said camera body, and means connecting said constant current source to said resistor through said contact point.

13. An interchangeable photographing lens according to claim 11, in which the first information is indicative of the type of an interchangeable lens such as wide-angle, standard or telephoto.

14. An interchangeable photographing lens according to claim 11, in which the first information is the open F value of the interchangeable lens.

15. An interchangeable photographing lens according to claim 13 or 14, in which the lens is a zoom lens and the second information is representative of the focal length of said zoom lens.

16. An interchangeable photographing lens according to claims 13 or 14, in which the lens ia a macro lens and the second information is representative of the photographing distance of said macro lens.

17. In a photographing camera of the type having an interchangeable lens, in which information representative of said interchangeable photographing lens necessary for determination of photographing condition is fed into an information processing unit of the camera by means of an information transmission means of the photographing lens through a contact point to be connected at the time when an interchangeable lens is coupled to a camera body, the improvement comprising separating means within said camera connected between the contact point and the information processing unit for separating the transmitted information into a first information which is represented by a value that varies stepwise by a range greater than a predetermined range, and a second information which is represented by a value variable within the predetermined range.

18. In a camera according to claim 17, in which said information tramsmission means is a resistor and said camera is provided with a constant current source to supply constant current to the resistor through the contact point.

* * * * *